(12) United States Patent
Macleod et al.

(10) Patent No.: US 9,539,536 B2
(45) Date of Patent: Jan. 10, 2017

(54) DESULPHURISATION MATERIAL COMPRISING COPPER SUPPORTED ON ZINC OXIDE

(75) Inventors: Norman Macleod, Tyne and Wear (GB); Gordon Edward Wilson, Cleveland (GB)

(73) Assignee: JOHNSON MATTHEY PUBLIC LIMITED COMPANY, London (GB)

(*) Notice: Subject to any disclaimer, the term of this patent is extended or adjusted under 35 U.S.C. 154(b) by 248 days.

(21) Appl. No.: 14/233,217

(22) PCT Filed: Apr. 12, 2012

(86) PCT No.: PCT/GB2012/050808
§ 371 (c)(1),
(2), (4) Date: Jan. 16, 2014

(87) PCT Pub. No.: WO2013/014415
PCT Pub. Date: Jan. 31, 2013

(65) Prior Publication Data
US 2014/0161701 A1    Jun. 12, 2014

(30) Foreign Application Priority Data
Jul. 22, 2011  (GB) .................................. 1112606.7

(51) Int. Cl.
| | | |
|---|---|---|
| *B01D 53/52* | (2006.01) | |
| *B01D 53/14* | (2006.01) | |
| *B01J 23/80* | (2006.01) | |
| *B01J 35/00* | (2006.01) | |
| *B01J 35/02* | (2006.01) | |
| *B01J 35/10* | (2006.01) | |
| *B01J 37/00* | (2006.01) | |
| *B01J 37/04* | (2006.01) | |
| *B01D 53/82* | (2006.01) | |

(52) U.S. Cl.
CPC ............... *B01D 53/14* (2013.01); *B01D 53/52* (2013.01); *B01J 23/80* (2013.01); *B01J 35/002* (2013.01); *B01J 35/023* (2013.01); *B01J 35/1014* (2013.01); *B01J 35/1038* (2013.01); *B01J 37/0063* (2013.01); *B01J 37/04* (2013.01); *B01D 53/82* (2013.01); *B01D 2253/1124* (2013.01); *B01D 2253/25* (2013.01); *B01D 2253/304* (2013.01); *B01D 2253/306* (2013.01); *B01D 2253/311* (2013.01); *B01D 2255/20761* (2013.01); *B01D 2255/20792* (2013.01); *B01D 2256/24* (2013.01); *B01D 2256/245* (2013.01); *B01D 2257/304* (2013.01); *B01D 2257/306* (2013.01); *B01D 2257/308* (2013.01); *Y10T 428/2982* (2015.01)

(58) Field of Classification Search
CPC .......... B01J 23/80; B01J 35/00; B01J 35/002; B01J 35/023; B01J 35/1014; B01J 35/1038; B01J 37/0063; B01J 37/04; B01J 37/00; B01J 20/30; B01J 20/06; B01D 53/52; B01D 53/14; B01D 53/86; B01D 2253/1124; B01D 2253/25; B01D 2253/304; B01D 2253/306; B01D 2253/311; B01D 2255/20761; B01D 2255/20792; B01D 2256/24; B01D 2256/245; B01D 2257/304; B01D 2257/306; B01D 2257/308; B01D 2257/2982

See application file for complete search history.

(56) References Cited

U.S. PATENT DOCUMENTS

| | | |
|---|---|---|
| 4,071,609 A | 1/1978 | Robinson |
| 2002/0182135 A1 | 12/2002 | Braga et al. |

FOREIGN PATENT DOCUMENTS

| | | | |
|---|---|---|---|
| DE | 102005004368 A1 | 8/2006 | |
| ES | WO 2009112855 A1 * | 9/2009 | ............ B01J 20/02 |
| ES | WO 2011033280 A1 * | 3/2011 | ............ B01D 53/52 |
| GB | 1 319 515 A | 6/1973 | |
| JP | 5227404 | 3/1977 | |
| WO | 2009112855 A1 | 9/2009 | |
| WO | 2009112856 A1 | 9/2009 | |
| WO | 2011033280 A1 | 3/2011 | |

OTHER PUBLICATIONS

International Search Report, dated Aug. 16, 2012, from corresponding PCT application.
GB Search Report, dated Nov. 11, 2011, from corresponding GB application.

* cited by examiner

*Primary Examiner* — Melvin C Mayes
*Assistant Examiner* — Smita Patel
(74) *Attorney, Agent, or Firm* — Young & Thompson

(57) ABSTRACT

A particulate desulphurization material includes one or more copper compounds supported on a zinc oxide support material, wherein the desulphurization material has a copper content in the range 0.1 to 5.0% by weight and a tapped bulk density ≥1.55 kg/l. The material is obtained by (i) mixing a powdered copper compound with a particulate zinc support material comprising zinc oxide and one or more precursors that form zinc oxide upon calcination, and one or more binders to form a copper-containing composition, (ii) shaping the copper-containing composition by granulation, and (iii) drying and calcining the resulting granulated material.

5 Claims, No Drawings

DESULPHURISATION MATERIAL COMPRISING COPPER SUPPORTED ON ZINC OXIDE

BACKGROUND OF THE INVENTION

Field of the Invention

This invention relates to desulphurisation materials and in particular desulphurisation materials comprising copper and zinc oxide.

Description of the Related Art

Hydrocarbon feedstocks intended for use in synthesis gas generation must first be desulphurised in order to protect sensitive downstream catalysts from deactivation. Sulphur removal is conventionally carried out using a combination of hydrodesulphurisation (HDS) catalysis (based typically on CoMo or NiMo catalysts) and zinc oxide based absorbents. The zinc-based absorbents are designed to capture $H_2S$ according to the following equation;

$$ZnO + H_2S \rightarrow ZnS + H_2O$$

The performance of ZnO based absorbents used for sulphur capture is a compromise between density and porosity. High density allows more ZnO to be loaded into a vessel on a unit volume basis, therefore increasing the theoretical sulphur pick-up available and potentially lengthening time between change-outs. However, in practice the low porosity and associated low surface area of such dense materials generates a kinetic barrier to the sulphiding process, which prevents a significant amount of the ZnO present in the reactor being utilised effectively.

This consideration has placed a practical upper limit on the density of current-generation ZnO based products used in commercial operation. This upper limit is in the region of 1.5 kg/l.

SUMMARY OF THE INVENTION

Surprisingly it has been found that low levels of copper can significantly speed up the sulphiding process, with the result that significantly higher density materials can be utilised effectively.

Accordingly, the invention provides a particulate granulated desulphurisation material comprising one or more copper compounds supported on a zinc oxide support material, wherein the desulphurisation material has a copper content, expressed as CuO, in the range 0.1 to 5.0% by weight and a tapped bulk density ≥1.55 kg/l.

The invention further provides a method of making the desulphurisation material and a process for the desulphurisation of a process fluid stream comprising contacting the stream, optionally in the presence of hydrogen, with the desulphurisation material.

The high density of the products provides high sulphur capacity in terms of sulphur removal per unit volume of absorbent installed (e.g. $kgS/m^3$). The use of a copper promoter ensures that the rate of sulphiding is sufficiently fast to maintain the reaction zone (mass transfer zone) within a reasonable bed length. This combination maximises the effectiveness of the absorbent bed, increases time between change-outs and ultimately improves the operating efficiency of plants where the products are employed.

The presence of copper will also provide the absorbent with some hydrogenation capability, which could be beneficial with regards to removal of trace levels of organo-sulphur compounds that slip through upstream HDS catalysts. This is particularly true for COS, whose conversion over HDS catalysts is often limited by equilibrium.

The physical properties of the present desulphurisation material enhance the sulphur sorption capacity. The tapped bulk density, which is a measurement commonly made for particulate catalysts and sorbents is ≥1.55 kg/l, preferably ≥1.60 kg/l. Tapped bulk density (TBD) measurements may be made as follows; a 1 liter measuring cylinder is filled with particulate desulphurisation material and tapped until constant volume achieved. The tapped volume is recorded. The material is then weighed and its density calculated. The particle size of the desulphurisation material, i.e. the particle diameter or width, is preferably between 1 and 10 mm, more preferably 1.5 to 7.5 mm, most preferably 2.5 to 5.0 mm. The aspect ratio, i.e. the diameter or width divided by the particle height, is preferably ≤2.

The pore volume of the desulphurisation material may be ≤0.22 $cm^3/g$. Preferably the pore volume is ≥0.05 cm3/g, more preferably ≥0.10 $cm^3/g$ so as to provide an acceptable surface area. The BET surface area may be ≤23 $m^2/g$. The BET surface area is preferably ≥5 $m^2/g$, more preferably ≥10 $m^2/g$. BET surface areas may be determined by nitrogen physisorption. Pore volume may be determined using mercury porosimetry.

The copper content of the desulphurisation material, expressed as CuO, is in the range 0.1 to 5.0% by weight, preferably 0.5 to 4.0% by weight, more preferably 1.0 to 3.5% by weight. The copper compound may be selected from copper metal, copper oxide, copper hydroxide, copper nitrate, copper acetate and copper hydroxycarbonate. The copper compound used in the preparation of the material may be the same or different to that in the final material. In one embodiment a copper hydroxycarbonate is combined with the zinc support material and the resulting mixture calcined to provide the desulphurisation material with the copper in the form of copper oxide. Whether the copper is in the form of copper oxide or another copper compound, in use, the material may be exposed to a reducing gas stream such that the copper compound may be reduced to copper metal.

The particulate zinc material may be selected from zinc oxide, a zinc oxide/alumina mixture or a zinc-alumina hydrotalcite material. The particulate zinc material may also comprise one or more precursors that form zinc oxide upon calcination. The Zn content after calcination (expressed as ZnO) is preferably ≥80% wt, especially ≥87% wt in the desulphurisation material.

The desulphurisation material may, if desired, further comprise a second support material or second metal compound to alter the physical properties or alter the sulphur capacity.

The second support material may be one or more refractory oxides, especially alumina, which may be present at a level in the calcined material up to 20% by weight.

The second metal compound may be one or more compounds of iron, manganese, cobalt or nickel, preferably nickel. The second metal compound may be selected from the group consisting of metal, metal oxide, metal hydroxide, metal nitrate, metal acetate and metal hydroxycarbonate. The second metal compound used in the preparation of the material may be the same or different to that in the final material. For example, a metal hydroxycarbonate may be combined with the other components and the resulting mixture calcined to provide the material with the second metal in the form of metal oxide. For nickel and cobalt, whether the metal is in the form of cobalt oxide, nickel oxide or another metal compound, in use, the material may be exposed to a reducing gas stream such that the nickel compound or cobalt compound may be reduced to the metal. The amount of second metal compound present in the material in a reduced or unreduced state preferably is such that the second metal content is in the range 0.1 to 5% by weight, preferably 0.5-5% by weight.

The desulphurisation material may be prepared using known methods, such as impregnation of a particulate zinc oxide support material with one or more copper compounds followed by drying and calcining, or extrusion of pastes comprising a zinc oxide support material and copper compound followed by drying and calcination; or granulation of powdered copper compound and zinc support material usually in the presence of a binder, followed by drying and calcination Hence the method of making a desulphurisation material according to the present invention comprises the steps of:
(i) mixing a copper compound with a particulate zinc support material to form copper-containing composition,
(ii) shaping the copper-containing composition, and
(iii) drying and calcining the resulting material.

The shaping step may be by granulating, pelleting or extruding of the material through shaped dies according to methods known to those skilled in the art. Hence the desulphurisation material may be in the form of shaped units such as spheres, pellets, cylinders, rings, or multi-holed pellets, which may be multi-lobed or fluted, e.g. of cloverleaf cross-section.

Preferably the desulphurisation material is shaped by granulation. In this technique, powdered copper compound, zinc support material and one or more binders are mixed in the presence of a small amount of water in order to form roughly spherical agglomerates. Suitable binders include cement binders, such as calcium aluminate cements, and clay binders, such as attapulgite or sepiolite clays. The granulated materials are dried and calcined to form the desulphurisation material in oxidic form.

The density of the desulphurisation material may be controlled by appropriate selection of the ZnO precursor materials employed. The physical characteristics can be adjusted using known methods provide the desired product density.

Thus in a particularly preferred embodiment, the desulphurisation material comprises granules formed from one or more copper compounds, a zinc oxide support material and one or more binders. The one or more binders may be selected from the group consisting of clay binders and cement binders and mixtures thereof. The granules preferably have a particle diameter in the range 1 to 10 mm, more preferably 1.5 to 7.5 mm, most preferably 2.5 to 5.0 mm.

Drying and calcining may be performed in one or two stages. Drying is typically performed at 40 to 120° C. Calcination may be performed at 250° C. to 750° C. for up to 24 hours, but is preferably performed at 250 to 550° C. over 1-10 hours. Calcination converts any non-oxidic copper and zinc compounds into copper oxide and zinc oxide and reacts the binders, if present, with the composition thereby increasing the strength of the product.

The desulphurisation material may then be provided in its calcined form for installation by the end-user.

The invention includes a process for the desulphurisation of a process fluid stream comprising contacting the stream, with the desulphurisation material. The desulphurisation materials may be applied to the desulphurisation of a wide range of sulphur containing liquids and gases including hydrocarbons such as natural gas, liquid natural gas, natural gas liquids, refinery off-gas and fuel gases, kerosene, cracked naphtha, diesel fuels; carbon dioxide, carbon monoxide, hydrogen, and mixtures of these, including synthesis gas mixtures with a wide range of compositions. In particular, the desulphurisation materials may be applied to gaseous hydrocarbon streams, which may comprise hydrogen. Preferably, the desulphurisation material is applied to a gaseous hydrocarbon stream intended for use as a feed to steam-reforming unit. Such hydrocarbon streams include sulphur-containing natural gases and associated gas streams as well as coal-bed methane and other methane-rich gases.

The particulate desulphurisation material may be used at temperatures in the range 250 to 450° C., preferably 300-400° C. more preferably 320-400° C. and at pressures in the range 1 to 100 bar abs. Hydrogen is not required in use, but may typically be provided in the streams at a level in the range 0.1 to 25% by volume, preferably 1-5% by volume.

The desulphurisation materials are primarily designed to remove hydrogen sulphide by absorption, although other sulphur compounds such as carbonyl sulphide, carbon disulphide, mercaptans such as t-butyl mercaptan, dialkyl sulphides such as dimethyl sulphide, cyclic sulphides such as tetrahydrothiophene, dialkyl disulphides such as diethyl disulphide and thiophenic species may also be captured, especially if the feed stream contains hydrogen or another reductant. However, where organo-sulphur compounds are present in the feed, the desulphurisation materials are preferably used in combination with an upstream HDS catalyst, such as a conventional CoMo or NiMo based HDS catalyst, which is used to convert organo-sulphur in the feedstock to hydrogen sulphide prior to contact with the desulphurisation material

DETAILED DESCRIPTION OF THE INVENTION

The invention will now be further described by reference to the following examples.

Tapped bulk density (TBD) was measured by filling a 1 liter measuring cylinder with particulate desulphurisation material and tapping its walls until a constant volume was achieved. The tapped volume was recorded. The material was then weighed and its density calculated.

The sulphur content of the used desulphurisation materials was determined using a LECO SC632 instrument.

The BET surface areas were measured using Micromeritics ASAP 2420 and Micromeritics Tristar 3000 equipment. The samples were outgassed at 140° C. for at least 1 hr with dry nitrogen purge. All instruments comply with ASTM D3663-03 (N2 BET area) and ASTM D4222-03 (N2 ads/des isotherm).

Pore volumes were derived from mercury porosimetry using a Micromeritics AutoPore 9520 mercury porosimeter designed to comply with ASTM D4284-03. The samples were dried at 115° C. overnight before analysis. Pore volumes measured at 60 000 psia after inter-particle intrusion had been removed.

Densitometry: Pore volumes were calculated from the skeletal and geometric densities of the samples. Skeletal densities were measured using a Micromeritics AccuPyc 1330 helium pycnometer. Geometric densities were measured using an in-house mercury pycnometer. Again the samples were dried at 115° C. overnight before analysis. Both methods comply with ASTM D6761-02

EXAMPLE 1

Comparative

In a first test, a 60 ml sample of KATALCO$_{JM}$™ 32-5 (2.8-4.75 mm, 91.5 wt % ZnO) was loaded into a 19 mm ID glass reactor tube. The sample was subsequently heated in flowing nitrogen to 370° C. Once at temperature the gas feed was then switched to 5 vol % $H_2S$+95 vol % $H_2$ delivered at 42 l/hr and atmospheric pressure. The $H_2S$ level exit the absorbent bed was then monitored periodically using Dragger tubes until such time as the exit $H_2S$ level exceeded 100 ppmv. At this point the test was discontinued. The sulphided absorbent was subsequently discharged in 6 discrete layers. The sulphur pick-up on each layer was measured using a LECO instrument. The results obtained were subsequently used to determine a bed-averaged sulphur pick-up (average of the six sub-bed sulphur measurements). The result obtained is reported in Table 1 in units of kg S/l.

The corresponding tapped bulk density, BET surface area, mercury porosimetry and densitometry data for fresh KATALCO$_{JM}$ 32-5 are provided in Table 2.

EXAMPLE 2

Comparative

To 75 parts of ZnO were added 25 parts of basic zinc carbonate and 7.0 parts of a calcium aluminate binder. The resulting powder was thoroughly mixed and then granulated with appropriate water addition using an orbital planetary mixer. The produced granules were then sieved and the on-size fraction (2.8-4.75 mm) calcined. The ZnO loading in the finished product was measured by XRF and found to be 92.7 wt %. An accelerated sulphiding test was subsequently carried out on this material under conditions identical to those specified in Example 1. Again the results obtained are reported in Table 1 in units of kg S/l.

The corresponding tapped bulk density, BET surface area, mercury porosimetry and densitometry data for fresh material are again provided in Table 2.

EXAMPLE 3

Inventive

To 75 parts of ZnO were added 25 parts of zinc hydroxycarbonate, 7.0 parts of a calcium aluminate binder and 2.2 parts of copper hydroxycarbonate. The resulting powder was thoroughly mixed and then granulated with appropriate water addition using an orbital planetary mixer. The produced granules were then sieved and the on-size fraction (2.8-4.75 mm) calcined. The CuO and ZnO loadings in the finished product were measured by XRF and found to be 1.7 wt % and 92.1 wt % respectively. An accelerated sulphiding test was subsequently carried out on this material under conditions identical to those specified in Example 1. Again the results obtained are reported in Table 1 in units of Kg S/l.

The corresponding tapped bulk density, BET surface area, mercury porosimetry and densitometry data for fresh material are again provided in Table 2.

TABLE 1

Accelerated sulphiding test results.

| | CuO loading (wt %) | ZnO loading (wt %) | Fresh TBD (kg/l) | Sulphur pick-up (kgS/l) | ZnO conversion to ZnS (%) |
|---|---|---|---|---|---|
| Example 1 | 0.0 | 91.5 | 1.40 | 0.197 | 46 |
| Example 2 | 0.0 | 92.7 | 1.69 | 0.198 | 38 |
| Example 3 | 1.7 | 92.1 | 1.64 | 0.298 | 59 |

TABLE 2

Nitrogen physisorption and mercury porosimetry data

| | Surface area (BET) ($m^2$/g) | Corrected intrusion volume ($cm^3$/g) | Entrapment (% v/v) | Mean pore diameter (Å) |
|---|---|---|---|---|
| Example 1 | 29 | 0.24 | 26 | 583 |
| Example 2 | 17 | 0.17 | 33 | 716 |
| Example 3 | 19 | 0.18 | 36 | 856 |

Densitometry data

| | Skeletal (He) density (g/$cm^3$) | Geometric (Hg) density (g/$cm^3$) | Pore volume ($cm^3$/g) |
|---|---|---|---|
| Example 1 | 4.99 | 2.23 | 0.25 |
| Example 2 | 5.06 | 2.67 | 0.18 |
| Example 3 | 5.07 | 2.57 | 0.19 |

In comparing the results of Examples 1 and 2, it is clear that just increasing the density of a ZnO absorbent is not in itself an effective strategy for improving the sulphur pick-up of the product. Although the material in Example 2 contained significantly more ZnO on a unit volume basis than in Example 1, because of the low surface area and porosity of the high density product, it was not able to effectively utilise this additional ZnO for further sulphur capture (the ZnO conversion efficiency at the point of 100 vppm $H_2S$ breakthrough dropped from 46% to 38% between these two cases under the conditions of the test). In contrast, when copper promotion is combined with increased density, as in Example 3, although the porosity and surface area of the product are reduced, the material is able to more effectively utilise the available ZnO for sulphur absorption, which leads to a considerable increase in sulphur capture per unit volume of absorbent.

This is surprising as normally it may be presumed that increasing the density and so reducing the pore volume and surface area would lead to a reduction in absorption of the sulphur compounds.

EXAMPLE 4

Comparative

Two 85 $cm^3$ capacity samples baskets containing KATALCO$_{JM}$ 32-5 were placed in an industrial desulphuriser vessel operating, at elevated temperature, in lead-lag mode. One basket was placed at the inlet of the vessel and one at the exit. After a period of time on line, the baskets were removed and the sulphur uptakes measured using a LECO instrument. The results obtained are reported in Table 3.

EXAMPLE 5

Inventive

The details of Example 4 were repeated with the exception that sample baskets, again placed at both the inlet and the exit of the vessel, were filled with a desulphurisation material prepared as described in Example 3 above. The results obtained are reported in Table 3.

TABLE 3

| | CuO loading (wt %) | ZnO loading (wt %) | Fresh TBD (kg/l) | Sulphur pick-up (kgS/l) | ZnO coversion to ZnS (%) |
|---|---|---|---|---|---|
| Industrial reactor sulphur pick-up results: Inlet baskets | | | | | |
| Example 4 | 0.0 | 91.5 | 1.40 | 0.350 | 75 |
| Example 5 | 1.7 | 92.1 | 1.64 | 0.468 | 84 |
| Industrial reactor sulphur pick-up results: Exit baskets | | | | | |
| Example 4 | 0.0 | 91.5 | 1.40 | 0.091 | 22 |
| Example 5 | 1.7 | 92.1 | 1.64 | 0.139 | 27 |

Examples 4 and 5 were tested simultaneously in the same desulphuriser vessel for the same length of time on line. Examples 4 and 5 show that the improved performance discussed above is also observed under real plant conditions.

The invention claimed is:

1. A method of making a particulate desulphurisation material comprising one or more copper compounds supported on a particulate zinc oxide support material, wherein the desulphurisation material is in the form of granules consisting of one or more powdered copper compounds, zinc oxide, zinc oxide formed by calcination of one or more zinc oxide precursors, and one or more binders, wherein the desulphurisation material has a copper content, expressed as CuO, in the range 0.1 to 5.0% by weight and a tapped bulk density $\geq 1.55$ kg/l, comprising the steps of:

(i) mixing one or more powdered copper compounds with a particulate zinc oxide support material comprising zinc oxide, one or more precursors that form zinc oxide upon calcination, and one or more binders to form a copper-containing composition, (ii) shaping the copper-containing composition by granulation, and (iii) drying and calcining the resulting granulated material to form the particulate desulphurization material.

2. The method according to claim 1, wherein the copper compound in the copper-containing composition is selected from the group consisting of copper oxide, copper hydroxide, and copper hydroxycarbonate.

3. The method according to claim 1, wherein the copper compound, zinc oxide support material, and one or more zinc oxide precursors are combined with one or more binders and granulated to form agglomerated spheres with a diameter in the range 1 to 10 mm.

4. The method according to claim 1, wherein the copper compound, zinc oxide support material, and one or more zinc oxide precursors are combined with one or more binders and granulated to form agglomerated spheres with a diameter in the range 1.5 to 7.5 mm.

5. The method according to claim 1, wherein the copper compound, zinc oxide support material, and one or more zinc oxide precursors are combined with one or more binders and granulated to form agglomerated spheres with a diameter in the range 2.5 to 5.0 mm.

* * * * *